United States Patent
Berube et al.

(10) Patent No.: US 10,295,102 B1
(45) Date of Patent: May 21, 2019

(54) ISOLATION TOOL WITH ENHANCED MONITORING UNIT

(71) Applicant: Car-Ber Investments Inc., Houston, TX (US)

(72) Inventors: Guy Berube, Sarnia (CA); Graham Travis Cecil Brown, Sarnia (CA); Joseph Tuskan, Wallaceburg (CA)

(73) Assignee: CAR-BER INVESTMENTS INC., Houston, TX (US)

( * ) Notice: Subject to any disclaimer, the term of this patent is extended or adjusted under 35 U.S.C. 154(b) by 0 days.

(21) Appl. No.: 15/916,006

(22) Filed: Mar. 8, 2018

(51) Int. Cl.
*F16L 55/11* (2006.01)
*F16L 55/134* (2006.01)
*F16L 55/132* (2006.01)

(52) U.S. Cl.
CPC .............. *F16L 55/11* (2013.01); *F16L 55/132* (2013.01); *F16L 55/134* (2013.01)

(58) Field of Classification Search
CPC ....... F16L 55/11; F16L 55/132; F16L 55/128; F16L 55/136; F16L 55/124; F16L 55/1283; Y10T 137/0475
USPC ........... 138/89, 97, 90, 93; 73/49.3, 49.5, 46
See application file for complete search history.

(56) References Cited

U.S. PATENT DOCUMENTS

| | | | | |
|---|---|---|---|---|
| 3,593,749 A * | 7/1971 | Reardon | ............... | F16L 55/136 138/93 |
| 4,267,401 A * | 5/1981 | Wilkinson | ........... | H01B 17/308 174/151 |
| 4,470,946 A * | 9/1984 | Vassalotti | ............. | F16L 55/136 138/90 |
| 4,848,406 A * | 7/1989 | Stauner | ................. | F16L 55/136 138/93 |
| 5,402,828 A * | 4/1995 | Pino | ...................... | F16L 55/134 138/89 |
| 5,522,432 A * | 6/1996 | Radant | ................. | G21C 13/028 138/89 |
| 6,732,762 B2 * | 5/2004 | Russell | ................. | F16L 55/136 138/89 |
| 7,240,697 B2 * | 7/2007 | Beebe | ................... | F16L 55/134 138/89 |
| 7,779,676 B2 * | 8/2010 | Carson | ................. | F16L 55/132 138/89 |

(Continued)

FOREIGN PATENT DOCUMENTS

| | | |
|---|---|---|
| CA | 2847874 C | 10/2014 |
| EP | 2981668 A4 | 10/2014 |
| WO | 2014161070 A1 | 10/2014 |

*Primary Examiner* — Patrick F Brinson
(74) *Attorney, Agent, or Firm* — Adler Pollock & Sheehan P.C.; Daniel J. Holmander, Esq.

(57) ABSTRACT

An isolation tool for providing a sealing barrier extending transversely across the bore for isolating a section of the bore during replacement of a pipe section includes: front and back plates and a central annular ring for securing front and back seal elements in position, preventing them from dislodging into the internal tool cavity; moveable gripper inserts which are tightened against the inner surface of various diameters of pipe to hold the tool stationary during operation; and support leg assemblies which assist tool installation, centering, and removal. The back plate defines multiple port connections. Engraved, brightly painted indicia corresponding to a torque and tightening sequence improve visibility in darkness. The tool is electronically monitored by a separate enhanced monitoring unit.

12 Claims, 11 Drawing Sheets

(56) References Cited

U.S. PATENT DOCUMENTS

| | | | |
|---|---|---|---|
| 8,955,551 B2* | 2/2015 | Carson | F16L 55/11 138/89 |
| 9,181,782 B2 | 11/2015 | Berube et al. | |
| 9,644,448 B2 | 5/2017 | Berube et al. | |
| 2016/0031638 A1* | 2/2016 | Noyon | F16L 55/11 220/315 |
| 2016/0040501 A1 | 2/2016 | Berube et al. | |
| 2017/0000992 A1 | 1/2017 | Acker et al. | |

* cited by examiner

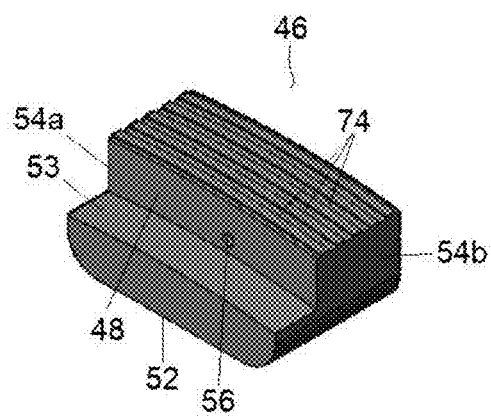
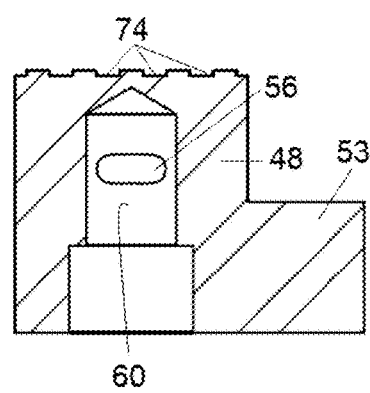
FIG. 4A
FIG. 4C
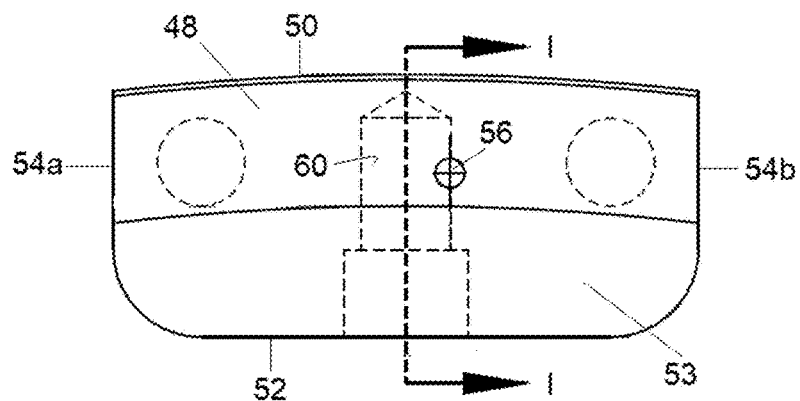
FIG. 4B
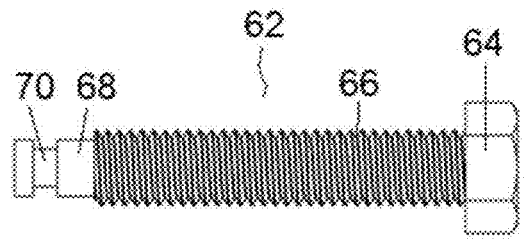
FIG. 4D

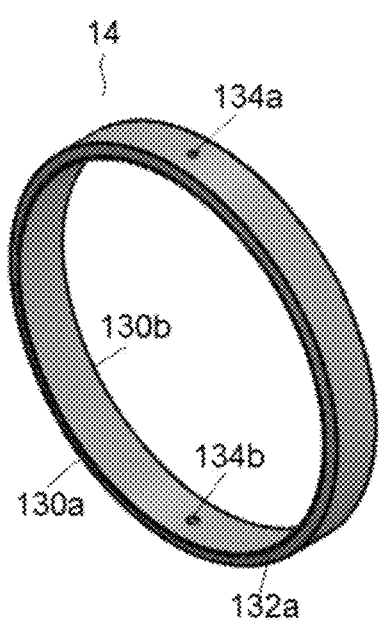
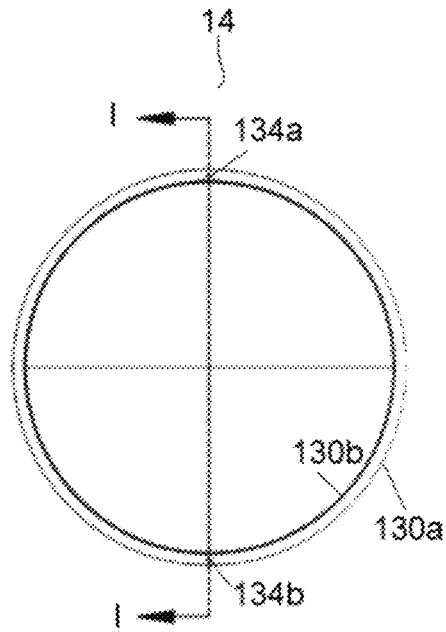
FIG. 6A          FIG. 6B
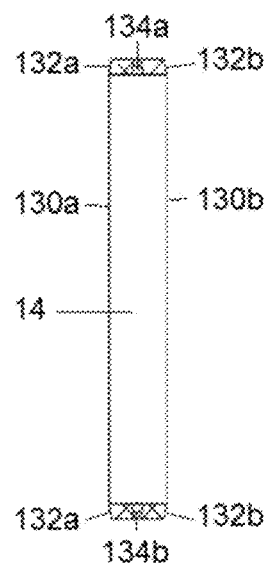
FIG. 6C

ISOLATION TOOL WITH ENHANCED MONITORING UNIT

FIELD OF THE INVENTION

The present invention relates generally to an improved mechanical assembly or isolation tool for use in providing a sealing barrier within a pipe bore during replacement of a section of the pipe, and an enhanced monitoring unit for same.

BACKGROUND OF THE INVENTION

In the fabrication of fluid flow systems, whether for the purposes of conveying liquid such as petro-chemicals, or gases such as natural gas, the use of conduits or pipes is typical. As pipes can be manufactured only to a finite length, various lengths or elbows must be connected together to structure the conduit fluid conveyance means. This is accomplished by welding butt ends of pipes together or to elbows etc., or alternatively, to weld the end of a pipe to a butt flange and to juxtapose two butt flanges together by means commonly known, for example, use of bolts through each juxtaposed annular portions of each butt flange. Generally, such flanges co-operatively employ gaskets as sealing elements. The welds are tested to determine whether there is any leakage since it is mandated that the amount of fluid escaping from any weld or flange/flange interface be reduced to allowable limits.

The problem relates to creating a safe environment for performing hot work on existing pipelines carrying hydrocarbon resources. Canadian Patent No. 2,847,874 (owned by applicant) describes an isolation tool which safely isolates a line for hot work to maintain safety of personnel. The isolation tool is placed into the line upstream of where hot-work is to be performed. Once the isolation tool is properly installed and two outer seals are established, medium is brought to pressure in the annulus between the seals. Once this pressure is established, the seals are actively monitored by the technician to ensure that no harmful vapors are passing beyond the isolation tool into the hot work zone. The problem encountered by applicant with this isolation tool is that as the pipe gets bigger, the isolation tool needs to be bigger also to seal with the bigger pipe. However, this results in a heavier, more expensive tool which is difficult to install or remove. There is also a need to be able to monitor remotely rather than in close proximity to the work zone.

Accordingly, there is a need in the art for an improved isolation tool which mitigates the above problems.

SUMMARY OF THE INVENTION

The present invention relates generally to an improved mechanical assembly or isolation tool for use in providing a sealing barrier within a pipe bore during replacement of a section of the pipe, and an enhanced monitoring unit for same. It was surprisingly discovered that by using the present invention, one or more of the following benefits may be realized:

The front and back plates and central annular ring are specifically designed to secure front and back seal elements in position, preventing them from dislodging into the internal cavity of the tool as follows:
The front plate has front and back faces, with the back face securing the front seal element in position in abutment against the front face, thereby preventing the seal element from dislodging into the internal cavity of the tool.

An annular bevel on the back plate secures the back seal element in position in abutment against the back face of the back plate, thereby preventing the seal element from dislodging into the internal cavity of the tool. Further, the annular bevel cooperates with the back seal element by facilitating the outward radial formation of the seal element when the front and back plates and central annular ring are compressed together when assembled.

Annular bevels on the central annular ring secure the front and back seal elements in position in abutment against the front and back plates, thereby preventing the seal elements from dislodging into the internal cavity of the tool. Further, the annular bevels cooperate with the seal elements by facilitating the outward radial formation of the seal elements when the front and back plates and central annular ring are compressed together when assembled. The annular ring is centered into its proper position within the tool by tapered annular support sleeves.

The back plate serves as a barrier extending transversely of the pipe bore. It also plays a role in the action of compressing the front and back plates and central annular ring together to deform the front and back seal elements outwardly into sealing engagement with the inner surface of the pipe. The back plate also defines multiple differently sized port connections to provide any desired connection with, for example, vent rod strings to address venting (i.e., steam, flare line, nitrogen purge, etc.) or a liquid level alarm.

The tool includes gripper inserts which are moveable from resting unactuated positions within recesses to actuated positions to extend outwardly from the recesses to contact and grip the inner surface of the pipe. The gripper inserts are conveniently moveable and adjustable to be tightened against the inner surface of various diameters of pipe in order to hold the tool stationary in its proper position within the pipe, and to hold back pressure without being moved out of the pipe. The tool is thus easy and quick to deploy and remains stationary and stable within the pipe during use. The gripper inserts are formed of stainless steel for material contact-compatibility considerations. In particular, there is little or no risk of carbon contamination of a stainless steel pipe because the gripper inserts are formed of the same material (i.e., stainless steel). Further, the gripper inserts do not damage the inner diameter of the pipe compared to other prior art tools. Provision of the gripper inserts eliminates the need to use a commercially available standard gripper kit to provide back pressure-retention capability required by particular jobs, nitrogen purges, line-stop work, etc.

The tool includes support leg assemblies which assist with tool installation, centering, and removal, making the tool quick to deploy. The support legs include roller balls which are smooth and will not damage the bottom inner surface of the pipe. The roller balls in the support leg assemblies are conveniently moveable and adjustable via screw threads to different distances to accommodate various pipe diameters.

The tool accelerates deployment by reducing the number of threaded elongate studs required to actuate the sealing mechanism. Installation proceeds quickly as there are fewer studs to torque compared to those present in prior art tools.

The tool can accommodate various sizes of seal elements to span a greater range of pipe diameters, thereby enabling many schedules for use with a single tool. The tool more easily utilizes larger O-rings in order to cover off a larger radial gap, in comparison to prior art tools. This also translates into minimal manufacturing costs (e.g., fewer sizes of isolation tools to manufacture) and substantial operational cost savings for both companies and their clients. The tool may also compensate for issues with out-of-round piping applications, which is a common problem for larger piping and can be time-consuming for technicians to deal with in the field.

The front plate, back plate, and central annular ring are formed of aluminum to make the overall tool lightweight and easy to handle by technicians. The seals may be formed from different deformable, resilient materials (for example, nitrile rubber) having varying durometers (i.e., Buna-N 50 Durometer).

The front plate of the tool includes engraved indicia corresponding to a torque and tightening sequence to avoid fading as often encountered with indicia which are simply painted directly onto a surface. The indicia are filled in with a luminescent or bright yellow paint so as to be clearly visible for example, within dim light or the darkness of a pipe bore. The front plate has a thickness sufficient to avoid bending during the torqueing and tightening.

The tool includes shoulder eye bolts through which chains, cable, rope, and the like may be threaded to facilitate lifting. In some embodiments, a technician may also simply grip lugs or handles to carry or handle the tool manually.

The tool is electronically monitored by a separate enhanced monitoring unit so that information can be relayed back and forth to the technician—for example, pressure testing, calibration, and alarm signal if either or both of the front and back seal elements should fail.

The enhanced monitoring unit provides analog pressure gauges, and a "double warning" by provision of digital pressure switches which measure pressure and display digital readings of pressure in green or red such that the readings are highly visible to the technician from a distance. The digital pressure switches are connected to a flasher which activates LED lights to blink, serving as a second back-up warning signal to accompany "red" readings. Visual signals are desirable where alarm bells or sirens may not be audible in a noisy environment or from a distance. However, audible alarms may also be provided.

The technician can safely replace the damaged section of pipe downstream from the tool. A pump at ground surface may be used to circulate pressurized medium (for example, water) down into the sealed space of the annular subassembly and back up to ground surface. The medium (for example, water) is brought to pressure in the sealed spaced defined by the annular subassembly. The pressure of the medium, which can be either static or flowing, is displayed by the analog pressure gauges and digital pressure switches, monitored, and provides an indication in real time of seal leakage. Observation of the readings will inform the technician if there is a reduction in medium pressure, thereby indicating seal leakage.

The tool can also be used for hydrodynamic services. Instead of the medium (for example, water) remaining static in the sealed spaced defined by the annular subassembly, the medium can be circulated through the tool to remove heat away from the metal of the pipe and to protect the downstream or upstream piping from exposure to such heat.

In one aspect, the invention comprises an isolation tool for positioning in a pipe bore and providing a sealing barrier extending transversely across the bore for isolating a section of the bore during replacement of a section of the pipe, the tool comprising a linear assemblage of components including:

a front plate for securely engaging a front seal element, and defining recesses housing gripper inserts moveable from unactuated positions within the recesses to actuated positions extending outwardly from the recesses to contact and grip the inner surface of the pipe to hold the tool stationary during operation;

a back plate defining an annular bevel for securely engaging a back seal element, and carrying support leg assemblies for assisting installation, centering, and removal of the tool within the pipe bore;

a central annular ring positioned between the front plate and the back plate, and defining annular bevels for cooperating with and spacing apart the front seal element and the back seal element;

the front seal element and the back seal element being resilient, deformable and annular, wherein when the front plate, the back plate, and the central annular ring are compressed together, the front seal element and the back seal element are prevented from dislodging into the interior of the tool, and are compressed and deformed outwardly into sealing engagement with the pipe, and combine with the outer surface of the tool and the inner surface of the pipe to form a sealed annular space.

In another aspect, the invention comprises a monitoring unit for use with the above inflatable isolation tool. The monitoring unit comprises a housing, a front panel subassembly, a back panel, an electrical inlet, and a LED power supply. In one embodiment, the front panel subassembly comprises a pair of analog pressure gauges, and a pair of digital pressure switches for measuring pressure and displaying digital readings of pressure in color to provide a first visual signal, the digital pressure switches being electrically connected to a flasher for activating LED lights to provide a second visual signal.

Additional aspects and advantages of the present invention will be apparent in view of the description, which follows. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described by way of an exemplary embodiment with reference to the accompanying simplified, diagrammatic, not-to-scale drawings. In the drawings:

FIG. 4A is a perspective view of a gripper insert of the isolation tool shown in FIG. 1.

FIG. 4B is a side view of the gripper insert shown in FIG. 4A, showing the inner chamber in hidden lines.

FIG. 4C is a cross-sectional view taken at section line I-I in FIG. 4B.

FIG. 4D is a side view of a bolt for insertion into the gripper insert shown in FIG. 4B.

FIG. 6A is a perspective view of the central annular ring of the isolation tool shown in FIG. 1.

FIG. 6B is a front view of the central annular ring shown in FIG. 6A.

FIG. 6C is a cross-sectional view taken at section line I-I in FIG. 6B.

DETAILED DESCRIPTION OF PREFERRED EMBODIMENTS

Figure 1:
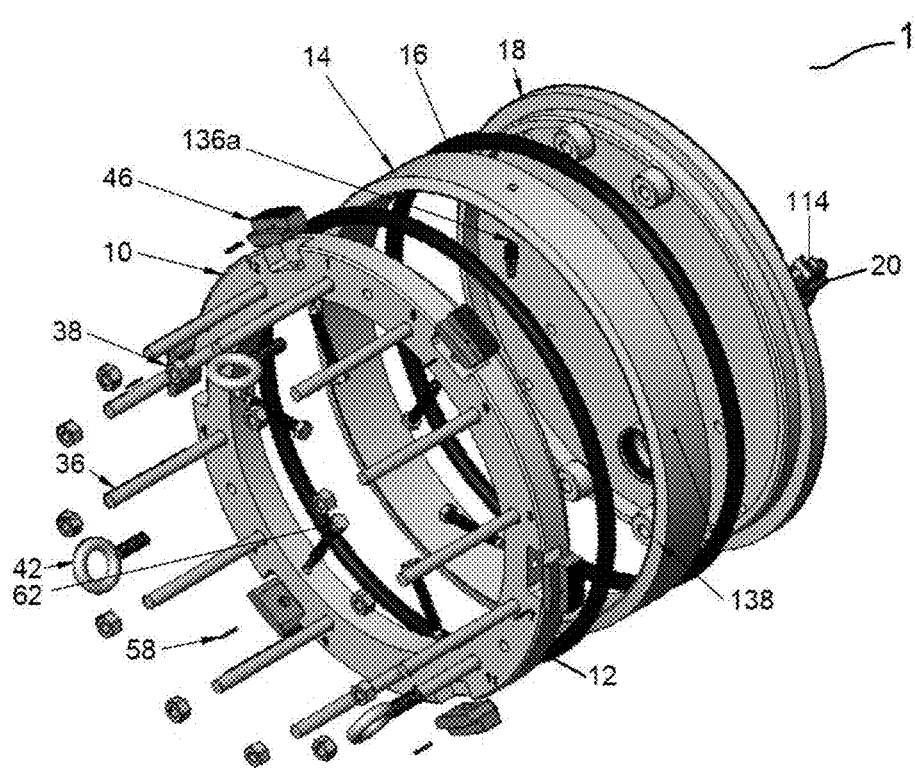
FIG. 1 is an exploded perspective view of the isolation tool, showing all components in detail.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a," "an," and "the" include plural referents unless the context clearly dictates otherwise.

The present invention relates to a mechanical assembly or "isolation tool" for use in providing a sealing barrier extending transversely across the pipe bore for isolating a section of the bore during replacement of a section of the pipe, and an enhanced monitoring unit for same.

The invention will now be described having reference to the accompanying figures. The isolation tool (1) is shown unassembled in FIG. 1, and assembled and ready to operate in FIG. 2. The isolation tool (1) is insertable into the bore of either a horizontal or vertical pipe. As used herein, the term "horizontal" means the orientation of a plane or line that is substantially parallel to the plane of the horizon. The term "vertical" means the orientation of a plane or line that is substantially at a right angle to the horizontal plane. In one embodiment, the pipe has an inner diameter of about 20 inches or greater. The purpose of the isolation tool (1) is to provide a sealed barrier which prevents flammable fluid from migrating within the bore of the pipe to the point where cutting, welding or other hot-work operations are to be conducted.

The isolation tool (1) generally comprises the following components: an isolation assembly incorporating a linear assemblage of components including a front plate (10), a front seal element (12), a central annular ring (14), a back seal element (16), and a back plate (18). As used herein, the terms "front" and "back" are used to describe the positions of various components of the isolation tool (1). The term "front" refers to a position closer to the open end of the pipe. The term "back" refers to a position away from the open end of the pipe. When the components are compressed together, the axially spaced apart annular front and back seal elements (12, 16) are deformed radially outward and seal against the inner surface of the pipe (not shown). A support leg assembly (20) facilitates placement of the isolation tool (1) centrally within the bore of the pipe.

The isolation tool (1) is shown unassembled in FIGS. 1, 3A-7C to show all the components in greater detail.

Figure 3A:
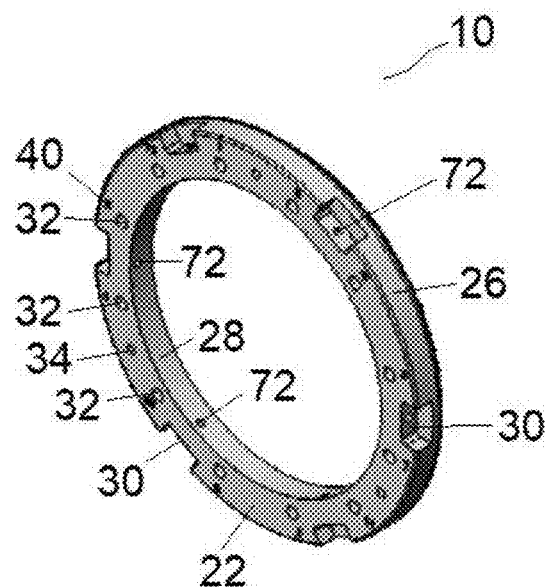
FIG. 3A is a perspective view of the front plate of the isolation tool shown in FIG. 1.
Figure 3B:
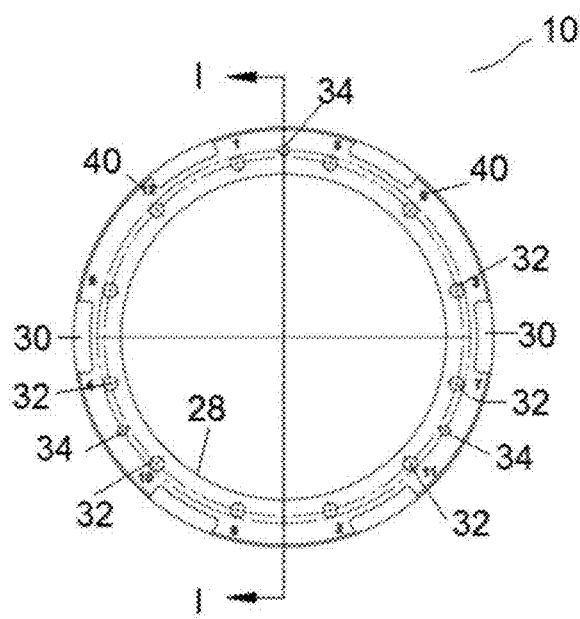
FIG. 3B is a front view of the front plate shown in FIG. 3A.
Figure 3C:
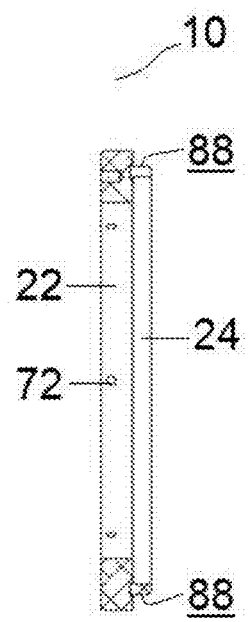
FIG. 3C is a cross-sectional view of the front plate shown in FIG. 3A.

Referring to FIGS. 3A-C, the front plate (10) is a circular disk having a front portion (22), a back portion (24), an outer edge (26), an inner edge (28), a plurality of recesses (30), a plurality of large holes (32), and a plurality of small holes (34).

Figure 2:
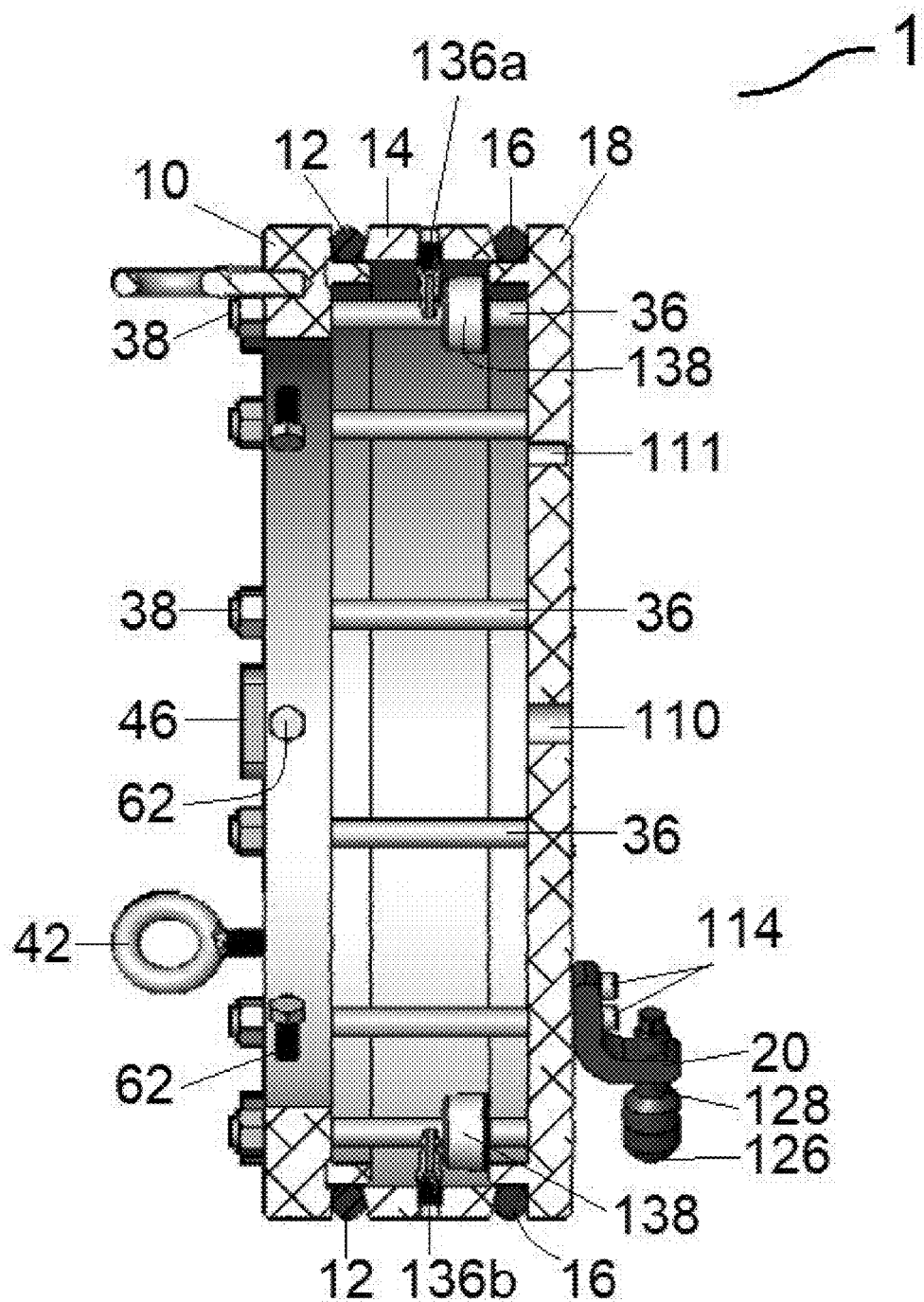
FIG. 2 is a cross-sectional view of the isolation tool shown in FIG. 1 fully assembled.

The large holes (32) are disposed over at least a part or the entirety of the front portion (22) of the front plate (10). In one embodiment, the large holes (32) are evenly distributed in a spaced apart manner from adjacent large holes (32) over the front portion (22). In one embodiment, a large hole (32) is positioned on each side of a recess (30). The large holes (32) extend through the front portion (22) for receiving elongated studs (36) therethrough which are secured by complementary hex nuts (38) to facilitate compression and assemblage of the components of the isolation tool (1), as shown in FIGS. 1 and 2.

The front portion (22) comprises indicia (40) (for example, numbers) positioned proximate each large hole (32) and near the outer edge (26) of the front plate (10). The indicia (40) correspond to a torque and tightening sequence for the hex nuts (38) and studs (36) during assembly of the isolation tool (1). In one embodiment, a criss-cross torque and tightening sequence is used for the circular bolt pattern on the front portion (22). In one embodiment, a twelve bolt criss-cross torque and tightening sequence is used for a 24 inch diameter isolation tool (FIG. 3B). In one embodiment, an eight bolt criss-cross torque and tightening sequence is used to decrease the amount of time required for torqueing and tightening the hex nuts (38) and studs (36). However, it is contemplated that the torque and tightening sequence may vary without departing from the scope of the present invention. A proper torque and tightening sequence ensures even preload distribution. In one embodiment, the front plate (10) has a thickness sufficient to avoid bending during the torqueing and tightening. In one embodiment, the front plate (10) has a thickness of about ¾ inches. The indicia (40) are engraved on the front portion (22) to avoid fading as often encountered with indicia which are simply painted directly onto a surface. The indicia (40) are filled in with a luminescent or bright yellow paint so as to be clearly visible for example, within dim light or the darkness of a pipe bore.

The small holes (34) are disposed over at least a part or the entirety of the front portion (22) of the front plate (10). In one embodiment, the small holes (34) are evenly distributed in a spaced apart manner from adjacent small holes (34) over the front portion (22). In one embodiment, a small hole (34) is positioned between adjacent recesses (30) and between two large holes (32). The small hole (34) partially extends through the front plate (10) and defines threads (not shown) for receiving a complementary threaded shoulder eye bolt (42), as shown in FIG. 1. In one embodiment, three small holes (34) are used for a 24 inch diameter isolation tool (1) to receive three shoulder eye bolts (42). However, it is contemplated that the number and size of the small holes (34) may vary without departing from the scope of the present invention. The isolation tool (1) may be lifted and moved using conventional oilfield equipment. Chains, cable, rope, and the like may be threaded through the shoulder eye bolts (42) to facilitate lifting.

In one embodiment (not shown), the front portion (22) may include handles or lugs formed integral with the front plate (10) and projecting inwardly away from the outer edge (26) of the front plate (10). This embodiment may be suitable for a larger isolation tool (1) which may be for example, greater than about 24 inches in diameter. A technician may simply grip the handles or lugs to carry or handle the isolation tool (1) manually.

The front portion (22) defines recesses (30) which are positioned along at least a portion or the entirety of the outer edge (26) of the front plate (10). In one embodiment, the recesses (30) are evenly distributed in a spaced apart manner from adjacent recesses (30) along the outer edge (26) of the front plate (10). In one embodiment, six recesses (30) are used for a 24 inch diameter isolation tool (1). However, it is contemplated that the number and size of the recesses (30) may vary without departing from the scope of the present invention. The recesses (30) are configured for receiving and accommodating complementary moveable gripper inserts (46). In one embodiment, the recesses (30) are substantially rectangular-shaped to receive and accommodate rectangular-shaped gripper inserts (46). While the Figures illustrate both rectangular-shaped recesses (30) and gripper inserts (46), it will be appreciated by those skilled in the art that other shapes are included with the scope of the invention.

As shown in FIGS. 4A-C, the moveable gripper insert (46) comprises a substantially rectangular-shaped body (48) having a top (50), bottom (52), and protruding edge (53). As viewed in cross-section in FIG. 4B, the top (50) is slightly concavely curved and the bottom (52) is substantially flat, while the sides (54a, 54b) are tapered. The body (48) defines an aperture (56) which extends through the body (48) for receiving a slotted spring pin (58) therethrough (FIG. 1). The slotted spring pin (58) comprises a cylindrical pin rolled from a strip of material with a slot to allow flexibility during insertion. The slotted spring pin (58) comprises a body having a diameter which is larger than the diameter of the aperture (56), and a chamfer on either one or both ends to facilitate inserting the pin (58) into the aperture (56). The spring action of the pin (58) allows it to compress as it assumes the diameter of the aperture (56). The body (48) of the gripper insert (46) defines an inner chamber (60) configured to receive and secure a hex bolt (62) having a head (64), threads (66), and a modified smooth end (68), as shown in FIG. 4D. A portion of the smooth end (68) has been cut away during manufacture to define a stem (70).

The front plate (10) defines a plurality of recess apertures (72) which extend through the front plate (10) from its outer edge (26) to its inner edge (28). When assembled, the hex bolt (62) is threaded into the recess aperture (72) and extends therethrough into the inner chamber (60) of the gripper insert (46). As shown in FIGS. 4B-C, the aperture (56) overlaps with the inner chamber (60). Placement of the slotted spring pin (58) through the aperture (56) contacts the stem (70) of the hex bolt (62) to retain the hex bolt (62) to the gripper insert (46).

The hex bolt (62) can be rotated manually by the technician to move the gripper insert (46) from a resting unactuated position within the recess (30) to an actuated position to extend outwardly from the recess (30) to contact and grip the inner surface of the pipe (not shown). The gripper insert (46) defines a plurality of strip grooves (74) which are formed in a longitudinal direction on the top (50) of the gripper insert (46) in order to yield a gripping, serrated non-slip surface. The gripper inserts (46) are conveniently moveable and adjustable to be tightened against the inner surface of various diameters of pipe in order to hold the isolation tool (1) stationary in its proper position within the pipe, and to hold back pressure without being moved out of the pipe. The isolation tool (1) is thus easy and quick to deploy and remains stationary and stable within the pipe during use.

The protruding edge (53) of the gripper insert (46) receives and secures a temporary or sacrificial O-ring (not shown) which is thereby positioned overtop the front plate (10) in order to protect the front and back seal elements (12, 16) from hot sparks or slags.

As shown in FIG. 3C, the back portion (24) of the front plate (10) has a diameter smaller than the diameter of the front portion (22) to engage the front seal element (12) such that the front seal element (12) extends over the outer surface (88) of the back portion (24). The back portion (24) secures the front seal element (12) in position in abutment against the front portion (22), thereby preventing the front seal element (12) from slipping or collapsing into the internal cavity of the isolation tool (1).

As shown in FIGS. 5A-D, the back plate (18) is a circular disk having front and back faces (92, 94). In one embodiment, the front face (92) is beveled along its perimeter to form an annular bevel (96). The annular bevel (96) is rearwardly angled, preferably at about 15 degrees. The annular bevel (96) engages the back seal element (16) such that the back seal element (16) extends over the annular bevel (96). The annular bevel (96) secures the back seal element (16) in position in abutment against the back face (94) of the back plate (18), thereby preventing the back seal element (16) from slipping or collapsing into the internal cavity of the isolation tool (1). Further, the annular bevel (96) cooperates with the back seal element (16) by facilitating the outward radial formation of the back seal element (16) when the front and back plates (10, 18) and central annular ring (14) are compressed together when assembled.

The back plate (18) defines a plurality of threaded holes (98) which are positioned over at least a portion or the entirety of the front face (92). In one embodiment, the holes (98) are evenly distributed in a spaced apart manner from adjacent holes (98) near the outer edge (100) of the front face (92). The holes (98) extend partially into the back plate (18) for receiving the complementary threaded ends of the elongated studs (36) which facilitate the compression and assemblage of the components of the isolation tool (1).

The back plate (18) serves as a barrier extending transversely of the pipe bore (not shown). It also plays a role in the action of compressing the front and back plates (10, 18) and central annular ring (14) together to deform the front and back seal elements (12, 16) outwardly into sealing engagement with the inner surface of the pipe.

Figure 5A:
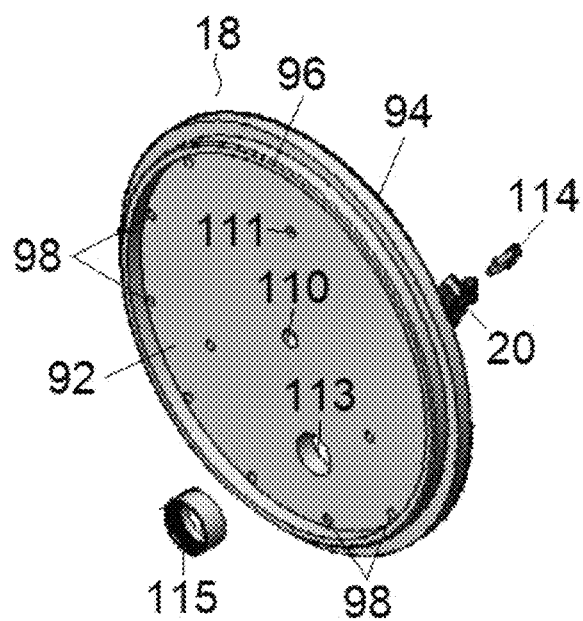
FIG. 5A is a perspective view of the back plate of the isolation tool shown in FIG. 1, showing the front face of the back plate.
Figure 5B:
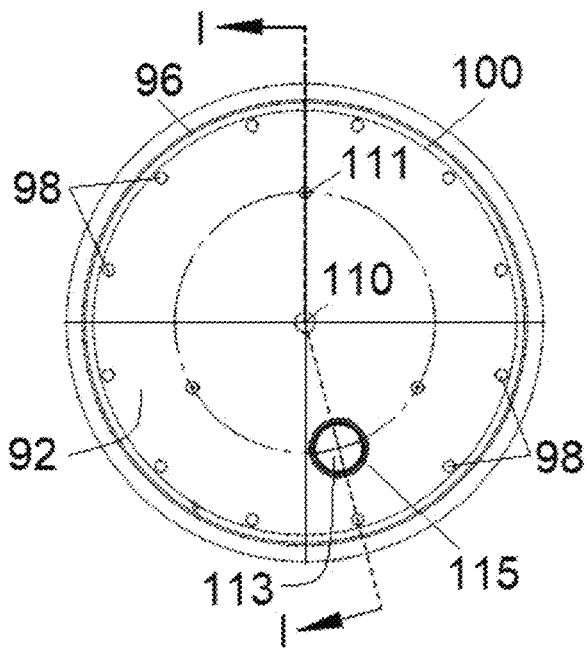
FIG. 5B is a front view of the back plate shown in FIG. 5A.
Figure 5C:
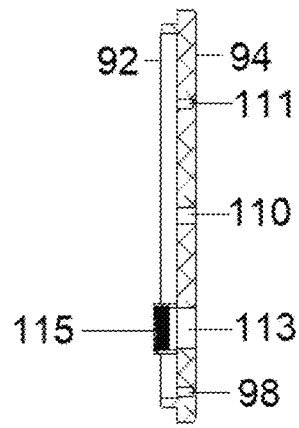
FIG. 5C is a cross-sectional view taken at section line I-I in FIG. 5B.

The back plate (18) defines one or more port connections comprising small, medium, or large diameter threaded apertures for re-routing any upstream vapors safely away from the hot-work area (FIGS. 5A-C). The upstream activity may also be monitored through a gauge to further ensure the safety of hot-work. If any change is detected in upstream activity, hot-work is immediately stopped until the situation is resolved. For such purpose, the back plate (18) defines port connections extending therethrough to allow for gas venting (for example, steam, flare line, nitrogen purge, etc.) or provision of a liquid level alarm.

In one embodiment, the back plate (18) defines a central threaded aperture (110). In one embodiment, the back plate (18) defines small diameter threaded apertures (111) having a smaller diameter compared to the other port connections. In one embodiment, the back plate (18) defines a pair of small diameter threaded apertures (111), one having a diameter of about ¾ inches, and the other having a diameter of about 2 inches. In one embodiment, the back plate (18) defines a peripheral threaded aperture (113) for receiving a half-coupler (115). In one embodiment, the peripheral threaded aperture (113) has a diameter larger than the diameter of the central threaded aperture (110).

Figure 5D:
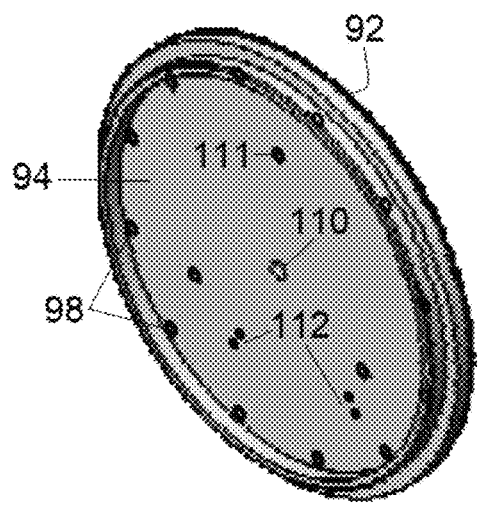
FIG. 5D is a perspective view of the back plate of the isolation tool shown in FIG. 1, showing the back face of the back plate.

On its back face (94) shown in FIG. 5D, the back plate (18) defines two sets of openings (112) in proximity to the holes (98) on the lower portion of the back plate (18). In one embodiment, each set of openings (112) is positioned above and between two adjacent holes (98). Each set of openings (112) comprises a pair of aligned openings through which attachment means such as, for example, cap screws (114) extend therethrough for securing a support leg assembly (20).

Figure 5E:
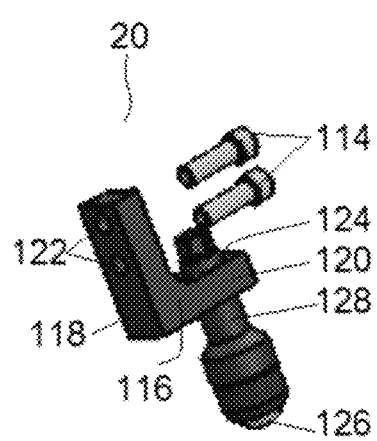
FIG. 5E is a perspective view of a support leg assembly attachable to the back face of the back plate shown in FIG. 5D.

As shown in FIG. 5E, the support leg assembly (20) comprises a substantially "L"-shaped body (116) having a vertical wall (118) perpendicular to a horizontal base (120). The vertical wall (118) defines a pair of openings (122) for receiving attachments means such as, for example, cap screws (114) to fasten the support leg assembly (20) to the undersurface or back face (94) of the back plate (18). The horizontal base (120) defines an aperture (124) for mounting a ball transfer unit bolt fixing comprising a roller ball (126) mounted within an adjustable bolt (128). In one embodiment, a pair of support leg assemblies (20) enables the isolation tool (1) to be easily installed, deployed, and removed. The isolation tool (1) can be rolled upon the movable roller balls (126) which are smooth and will not damage the bottom inner surface of the pipe, and can be easily rested in the desired position on the bottom inner surface of the pipe. The bolt (128) of the ball transfer unit bolt fixing is conveniently moveable and adjustable to different distances to accommodate various pipe diameters.

The support leg assemblies (20) assist tool installation, centering, and removal, making the tool (1) quick to deploy. In one embodiment, two support leg assemblies (20) support a 24 inch diameter isolation tool (1). However, it is contemplated that the number and style of the support leg assemblies (20) may vary without departing from the scope of the present invention. For example, in one embodiment (not shown), the roller ball (126) may be replaced by a wheel.

As shown in FIGS. 2 and 6A-C, the central annular ring (14) is positioned between the front plate (10) and the back plate (18). In one embodiment, the annular ring (14) is beveled along the perimeter of both edges (130a, 130b) to form annular bevels (132a, 132b). The annular bevels (132a, 132b) are rearwardly angled, preferably at about 15 degrees. The annular bevels (132a, 132b) engage the front and back seal elements respectively (12, 16) such that the front and back seal elements (12, 16) extend over the respective annular bevels (132a, 132b). The annular bevels (132a, 132b) secure the front and back seal elements (12, 16) in position in abutment against the front and back plates (10, 18), thereby preventing the front and back seal elements (12, 16) from slipping or collapsing into the internal cavity of the isolation tool (1). Further, the annular bevels (132a, 132b) cooperate with the front and back seal elements (12, 16) by facilitating the outward radial formation of the front and back seal elements (12, 16) when the front and back plates (10, 18) and central annular ring (14) are compressed together when assembled.

The annular ring (14) defines first and second opposed ports (134a, 134b) to receive connect plugs (136a, 136b) which extend therethrough (FIG. 2). In one embodiment, each connect plug (136a, 136b) comprises a brass connect plug which offers good corrosion resistance, low wear resistance, and is softer and easier to thread compared to steel plugs. The connect plugs (136a, 136b) couple to hoses (not shown) in order to pump water in and out to monitor the competence of the front and back sealing elements (12, 16). One connect plug (136a) serves as the medium inlet, while the other connect plug (136b) serves as the medium outlet. Once the tool (1) is properly installed, the medium (for example, water) is brought to pressure in the sealed spaced defined by the annular subassembly (14). A pressure gauge is used to display the pressure of the medium. The pressure of the medium, which can be either static or flowing, is monitored and provides an indication in real time of seal leakage. Observation of the gauge reading will inform the technician if there is a reduction in medium pressure, thereby indicating seal leakage.

Figure 7A:
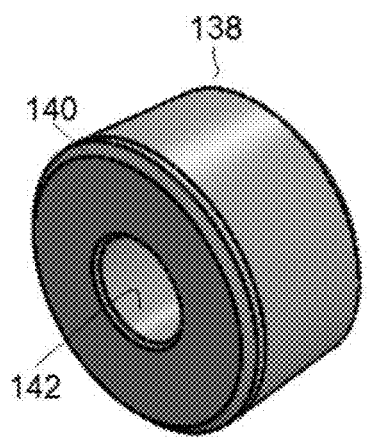
FIG. 7A is a perspective view of the annular support sleeve of the isolation tool shown in FIG. 1.
Figure 7B:
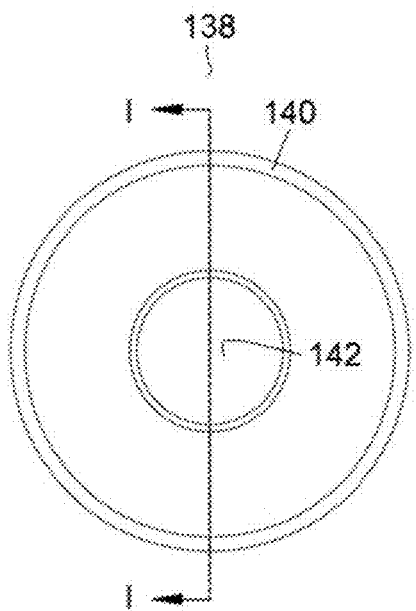
FIG. 7B is a front view of the annular support sleeve shown in FIG. 7A.
Figure 7C:
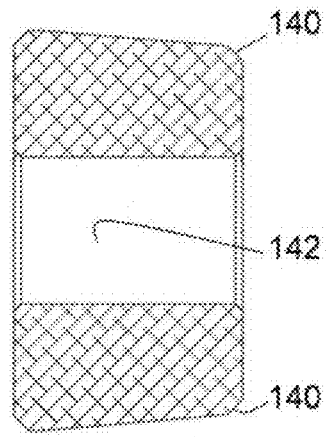
FIG. 7C is a cross-sectional view taken at section line I-I in FIG. 7B.

During assembly, the annular ring (14) is guided and centered into its proper position by a plurality of annular support sleeves (138). As shown in FIGS. 7A-C, each annular support sleeve (138) is substantially cylindrically-shaped, has a tapered edge (140), and defines a an aperture (142) through which the elongated stud (36) passes when assembled. The annular support sleeves (138) act as guides upon which the annular ring (14) is centered and rests in its proper position within the isolation tool (1). When properly positioned, the annular ring (14) abuts both the front and back seal elements (12, 16), and separates the front seal element (12) from the back seal element (16). In one embodiment, four annular support sleeves (138) support the annular ring (14) in a 24 inch diameter isolation tool (1). However, it is contemplated that the number of the annular support sleeves (138) may vary without departing from the scope of the present invention.

The front and back seal elements (12, 16) are annular and formed of deformable, resilient material, such as nitrile rubber. In one embodiment, the front and back seal elements (12, 16) comprise O-rings, and more specifically, Buna-N, 50 Durometer O-rings which are compatible with oils and gases. As previously described, the front and back plates (10, 18) and central annular ring (14) are specifically designed to trap the O-rings (12, 16) in position, preventing them from dislodging into the internal cavity of the isolation tool (1). Conveniently, the isolation tool (1) can accommodate various sizes of O-rings (12, 16) to span a greater range of pipe diameters, thereby enabling many schedules for use with a single isolation tool (1). In one embodiment for example, a single 24 inch isolation tool (1) can be used with O-rings ranging in size from about 5/8 inch cross-sectional diameter to about 1 inch cross-sectional diameter. This also translates into minimal manufacturing costs and substantial operational cost savings for both companies and their clients. Further, the provision of two axially separated front and back seal elements (12, 16) provides a safety factor. The spaced seal elements (12, 16) can be monitored for seal leakage which, if detected, may provide an opportunity to terminate welding.

The isolation tool (1) can be constructed from any material or combination of materials having suitable properties such as, for example, mechanical strength, ability to withstand cold and adverse field conditions, corrosion resistance, and ease of machining. In one embodiment, the front plate (10), back plate (18) and central annular ring (14) are formed of aluminum, making the isolation tool (1) considerably lightweight compared to prior art isolated tools formed of steel and other materials heavier than aluminum; for comparison, a prior art steel isolated tool weighs about 330 pounds. In one embodiment, the isolation tool (1) of 24 inches diameter has a weight of about 97 pounds. The O-rings may be formed of nitrile rubber compatible with oil and gases. The attachment means (36, 38, 42, 58, 62, 114) (e.g., elongated studs, hex nuts, shoulder eyebolts, slotted spring pins, hex bolt, cap screws) and ball transfer unit bolt fixing (126, 128) may be formed of steel, for example, stainless steel, carbon steel, and strength-bearing materials. The connect plugs (136a, 136b) may be formed of brass and the like. The gripper inserts (46) are formed of stainless steel for material contact-compatibility considerations. In particular, there is little or no risk of carbon contamination of a stainless steel pipe because the gripper inserts (46) are themselves formed of the same material (i.e., stainless steel).

The isolation tool (1) may be quickly assembled inside the pipe in less than an hour rather than multiple hours to a day as necessary with prior art isolation tools. During development of the invention, it was found that the assembly time was less than an hour for a relatively large 36 inch diameter tool. The tool (1) is assembled in the desired position within the pipe by piecing all components of the tool (1) in place within the pipe. The bolts (128) of the support leg assemblies (20) are pre-adjusted to a distance which accommodates the specific diameter of the pipe, and the tool (1) is rolled on the support leg assemblies (20) to "self-center" into the desired position within the pipe. The hex nuts (38) and studs (36) are torqued and tightened in the sequence set out by the indicia (40) on the front plate (10), thereby compressing the front and back plates (10, 18) and central annular ring (14) together to deform the front and back seal elements (12, 16) outwardly into sealing engagement with the inner surface of the pipe. The hex bolts (62) are then rotated manually by the technician to move the gripper inserts (46) from their resting unactuated positions within the recesses (30) to actuated positions to extend outwardly from the recesses (30) to contact and grip the inner surface of the pipe. With the isolation tool (1) and seals (12, 16) securely in place, the technician can safely replace the damaged section of pipe downstream from the isolation tool (1).

Once the tool (1) is properly installed and the front and back seal elements (12, 16) are compressed and deformed outwardly into sealing engagement with the pipe, the medium (for example, water) is brought to pressure in the sealed spaced defined by the annular subassembly (14). A pressure gauge is used to display the pressure of the medium. The medium pressure, which can be either static or flowing, is monitored and provides an indication in real time of seal leakage. Observation of the gauge reading will inform the technician if there is a reduction in medium pressure, thereby indicating seal leakage.

Figure 8A:
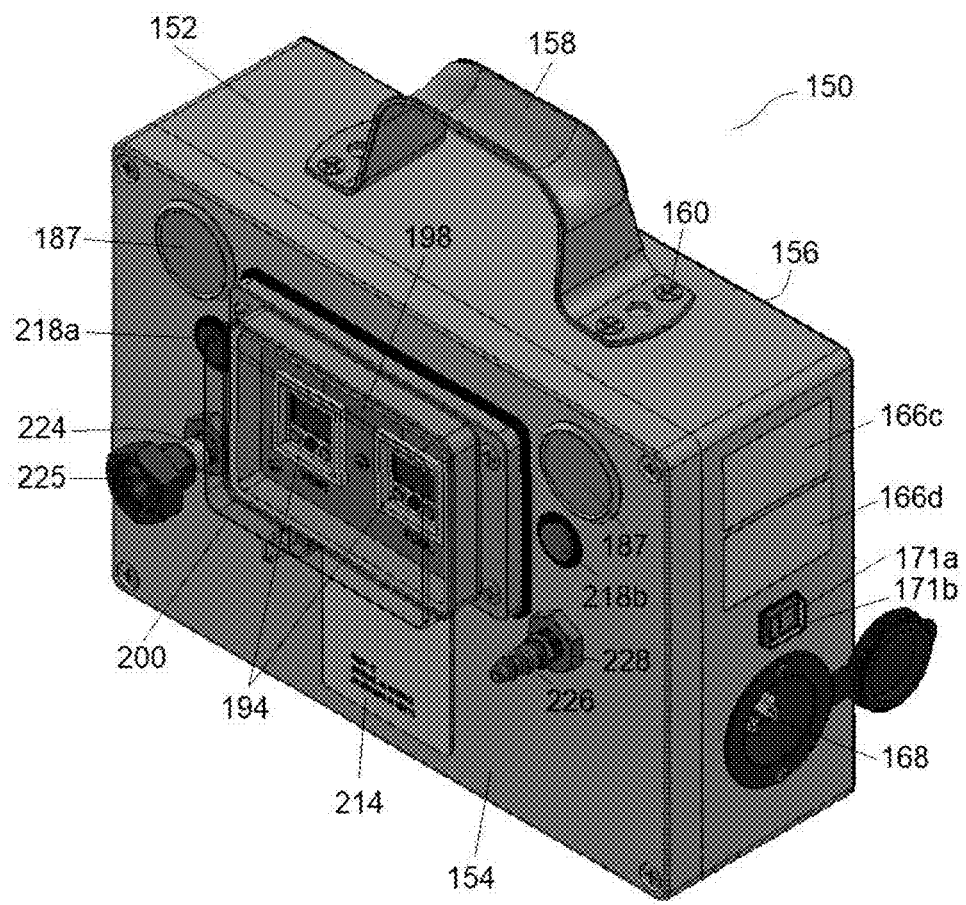
FIG. 8A is a front view of one embodiment of an enhanced monitoring unit for use with the isolation tool of FIG. 1.
Figure 8B:
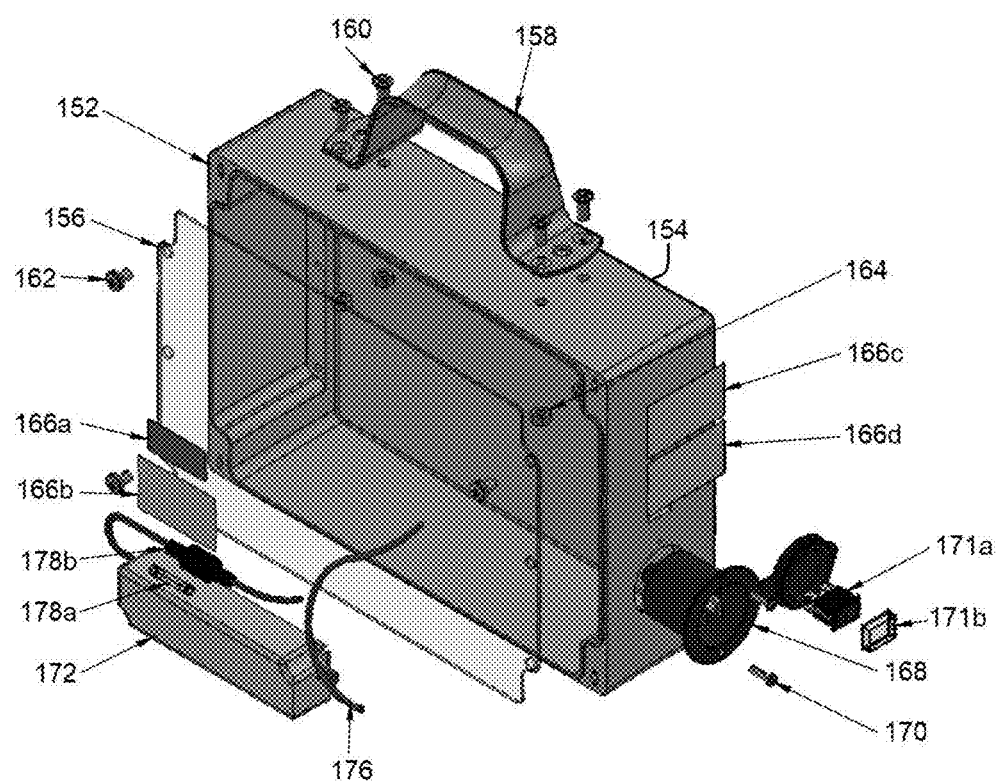
FIG. 8B is an exploded perspective view of the enhanced monitoring unit main housing subassembly shown in FIG. 8A.
Figure 8C:
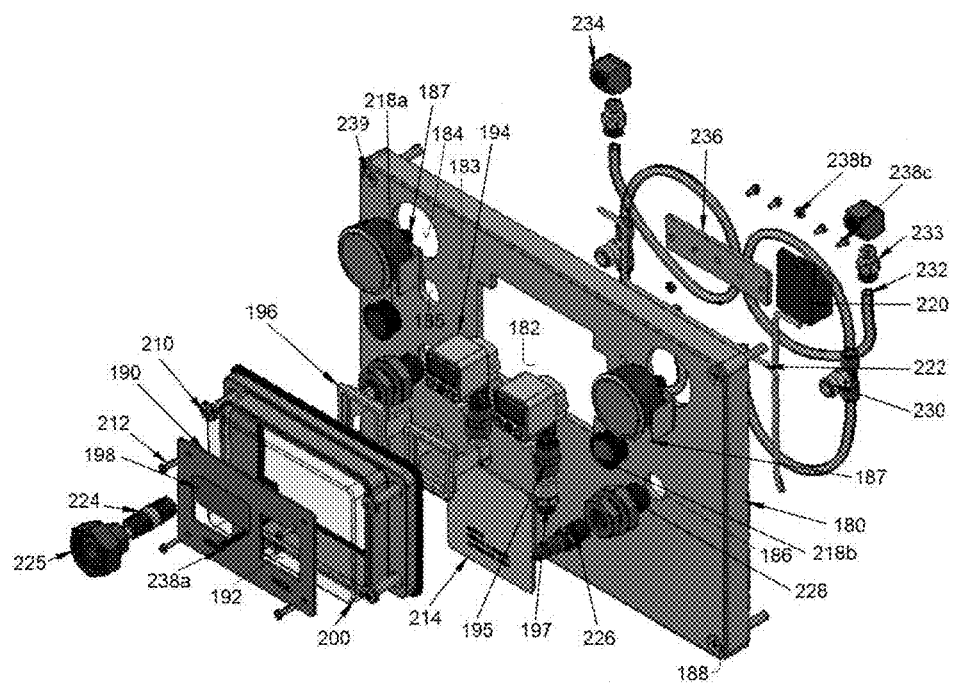
FIG. 8C is an exploded perspective view of the enhanced monitoring unit front panel subassembly shown in FIG. 8A, showing all inner components in greater detail.

In one embodiment, the pressure of the medium may be monitored remotely by using a separate enhanced monitoring unit (150), as shown in FIGS. 8A-C. The monitoring unit (150) relays information back and forth to the technician; for example, pressure testing, calibration, and an alarm signal if the front and back seal elements (12, 16) fail.

The enhanced monitoring unit (150) generally comprises a housing (152), a front panel subassembly (154), and a back panel (156) which are assembled together to form a substantially rectangular-shaped box to which a handle (158) may be attached by suitable attachment means (160). The back panel (156) is removably attached by fastening means (162, 164) in order to allow access to the front panel subassembly (154). Various required labels (166a, 166b, 166c, 166d) are attached to the monitoring unit (150) including for example, certification stickers, notice labels, warning labels, manufacturing labels, and the like. An electrical inlet (168) is attached to one side of the housing (152) by attachment means (170) for receiving a power cord which connects the monitoring unit (150) to an electricity supply. In one embodiment, internal batteries are provided, negating the need to connect the monitoring unit (150) to an electricity supply. An LED green illuminated rocker switch (171a) with a protective cover (171b) serves as an "ON/OFF" switch. The electrical inlet (168) is rain-tight and water resistant to seal out moisture and debris. A power supply (172) is electrically connected through wiring (176) to the front panel subassembly (154) for powering the LEDs. A fuse (178a) and fuse holder (178b) provide overcurrent protection of the electrical circuit.

The front panel assembly (154) is shown unassembled in FIG. 8C to show the inner components in greater detail. The front panel (180) comprises a substantially rectangular-shaped plate defining a window (182), small openings (183), top openings (184), middle openings (185), bottom openings (186), and corner openings (188).

The window (182) is configured for receiving and accommodating a pressure switch mounting plate (190). The pressure switch mounting plate (190) defines a pair of apertures (192) for receiving a pair of digital pressure switches (194) which are mounted to the plate (190) by brackets (196), and are attached to a pipe fitting (195) and a tube fitting (197). A required label (e.g., certification sticker and the like) (198) may be affixed to the pressure switch mounting plate (190). A transparent housing (200) is positioned over the digital pressure switches (194) and mounted by attachment means (210). The housing (200) is secured to the pressure switch mounting plate (190) by fastening means (212). An optional identification tag (214) may be attached to the monitoring unit (150) by suitable attachment means.

The top openings (184) receive pressure gauges (187). In one embodiment, the pressure gauges (187) are analog pressure gauges. The middle openings (185) receive LED lights (218) which are mounted therein. In one embodiment, a first LED light is red (218a) and a second LED light is amber (218b). The LED lights (218a, 218b) are electrically connected to an electronic flasher (220) by wiring (222).

The bottom openings (186) receive a nipple (224), a malleable union fitting (225), and a connect plug (226) which couple to other components such as, for example, complementary fittings (228) in order to couple to tube fittings (230). The tube fittings (230) receive tubing (232). The tubing (232) is attached to a tube fitting (233) and elbows (234) which in turn are connected to the bottom ported digital pressure switches (194). A pressure switch retainer (236) and attachment means (238a, 238b, 238c) secure the digital pressure switches to the front panel (180).

The corner openings (188) receive attachment means (239) which extend therethrough to secure the front panel (180) to the housing (152).

The tool (1) may be electronically monitored by being connected to the monitoring unit (150) using suitable hoses (not shown) which connect to each of the nipple (224) and the connect plug (226). In one embodiment, a flow meter (not shown) is provided for monitoring the flow rate of vent gas. In one embodiment, pressure readings are provided by both the analog pressure gauges (187) and digital pressure switches (194). Each digital pressure switch (194) of the monitoring unit (150) is initially adjusted using buttons to set the desired minimum and/or maximum pressure for each of the "VENT" and "TOOL." The digital pressure switch (194) measures pressure and displays digital readings of pressure in green or red such that the readings are highly visible to the technician from a distance. "Green" indicates readings of pressure which meet the minimum and/or maximum set pressure. "Red" indicates readings of pressure exceeding the maximum set pressure or pressure falling below the minimum set pressure. The digital pressure switches (194) are electrically connected to the flasher (220) which activates the LED lights (218a, 218b) to blink, serving as additional warning signs to accompany "red" readings. The technician is thus warned of a problem with the tool (1) by "double" visual signals. Visual signals are desirable where alarm bells or sirens may not be audible in a noisy environment or from a distance. However, audible alarms or output messages to hand-held devices, multiprocessor systems, microprocessor-based or programmable consumer electronics, personal computers, network PCs, mini-computers, mainframe computers, mobile phones, smart phones, tablets, personal digital assistants, and the like, may also be provided. In one embodiment, such devices may be temporarily or permanently connected to the monitoring unit (150) through a wireless communication protocol in order to set, read and/or monitor the configuration, programming, operation, and messages from the monitoring unit (150), and to allow data storage and retrieval.

A data acquisition system (not shown) captures and records inputs from the digital pressure switches (194). Such data or other information are relayed to the technician using a wireless transmitter; for example, pressure testing, calibration, and alarm signal if the either or both of the front and back seal elements should fail.

With the isolation tool (1) and seals (12, 16) securely in place, and the monitoring unit (150) operating, the technician can safely replace the damaged section of pipe downstream from the isolation tool (1). A pump at ground surface may be used to circulate pressurized medium (for example, water) down into the sealed space of the annular subassembly (14) and back up to ground surface. The medium (for example, water) is brought to pressure in the sealed spaced defined by the annular subassembly (14). The pressure of the medium, which can be either static or flowing, is displayed by the analog pressure gauges (187) and digital pressure switches (194), monitored, and provides an indication in real time of seal leakage. Observation of the readings will inform the technician if there is a reduction in medium pressure, thereby indicating seal leakage.

The tool can also be used for hydrodynamic services. Instead of the medium (for example, water) remaining static in the sealed spaced defined by the annular subassembly, the medium can be circulated through the tool to remove heat away from the metal of the pipe and to protect the downstream or upstream piping from exposure to such heat.

After use of the tool (1), the technician disassembles all components of the tool (1) piece by piece from within the pipe, with the disassembly including readjusting the gripper inserts (46) and loosening the hex nuts (38) to decompress the front and back plates (10, 18) and central annular ring (14) and to remove the sealing engagement of the front and back seal elements (12, 16) with the inner surface of the pipe.

It should be apparent, however, to those skilled in the art that many more modifications besides those already described are possible without departing from the inventive concepts herein. The inventive subject matter, therefore, is not to be restricted except in the scope of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Accordingly, various changes and modifications can be made to the exemplary embodiments and uses without departing from the scope of the invention as defined in the claims that follow.

What is claimed is:

1. An isolation tool for positioning in a pipe bore and providing a sealing barrier extending transversely across the bore for isolating a section of the bore during replacement of a section of the pipe, the tool comprising a linear assemblage of components including:

a front plate for securely engaging a front seal element, and defining recesses housing gripper inserts moveable from unactuated positions within the recesses to actuated positions extending outwardly from the recesses to contact and grip the inner surface of the pipe to hold the tool stationary during operation;

a back plate defining an annular bevel for securely engaging a back seal element, and carrying support leg assemblies for assisting installation, centering, and removal of the tool within the pipe bore;

a central annular ring positioned between the front plate and the back plate, and defining annular bevels for cooperating with and spacing apart the front seal element and the back seal element;

the front seal element and the back seal element being resilient, deformable and annular, wherein when the front plate, the back plate, and the central annular ring are compressed together, the front seal element and the back seal element are prevented from dislodging into the interior of the tool, and are compressed and deformed outwardly into sealing engagement with the pipe, and combine with the outer surface of the tool and the inner surface of the pipe to form a sealed annular space; wherein elongated studs extend through apertures defined by the front plate and the back plate, and are secured by complementary hex nuts for compressing the components together, wherein each support leg assembly comprises a substantially L-shaped body having a vertical wall perpendicular to a horizontal base, and defining openings for receiving attachment means for attaching the support leg assembly to the back plate, the horizontal base defining an aperture for mounting an adjustable bolt and roller ball.

2. The tool of claim 1, wherein the front plate comprises engraved painted indicia corresponding to a torque and tightening sequence for the hex nuts and the elongated studs.

3. The tool of claim 1, wherein each gripper insert defines strip grooves formed in a longitudinal direction on top of the gripper insert to yield a gripping, serrated non-slip surface.

4. The tool of claim 3, wherein each gripper insert further comprises a body defining an aperture for receiving a slotted spring pin therethrough, and an inner chamber for receiving and securing a hex bolt adjustable to actuate the gripper insert.

5. The tool of claim 4, wherein the hex bolt comprises an end defining a stem cooperative with the slotted spring pin.

6. The tool of claim 5, wherein the front plate defines recess apertures for receiving the hex bolt therethrough into the inner chamber of the gripper insert.

7. The tool of claim 4, wherein each gripper insert defines a protruding edge for securing a sacrificial O-ring to protect the front and back seal elements.

8. The tool of claim 1, wherein the central annular ring defines a pair of opposed ports for receiving connect plugs for coupling to hoses for testing seal leakage.

9. The tool of claim 8, further comprising annular support sleeves for centering the central annular ring, each annular support sleeve being substantially cylindrically-shaped, having a tapered edge, and defining an aperture for allowing passage of an elongated stud therethrough.

10. The tool of claim 1, wherein the front plate, the back plate, and the central annular ring are formed of aluminum, and the gripper inserts are formed of stainless steel.

11. The tool of claim 1, wherein the back plate defines one or more port connections comprising threaded apertures extending therethrough to allow for gas venting or provision of a liquid level alarm.

12. The tool of claim 1, wherein the front plate is configured with shoulder eye bolts, lugs, handles or a combination thereof to facilitate lifting of the tool.

* * * * *